(No Model.) 3 Sheets—Sheet 1.
O. A. SHOTTS.
CHECK ROWING ATTACHMENT FOR CORN PLANTERS.

No. 363,555. Patented May 24, 1887.

WITNESSES:
INVENTOR:
O. A. Shotts
BY Munn & Co
ATTORNEYS.

(No Model.) 3 Sheets—Sheet 2.

O. A. SHOTTS.
CHECK ROWING ATTACHMENT FOR CORN PLANTERS.

No. 363,555. Patented May 24, 1887.

WITNESSES:
Chas. Nida.
C. Sedgwick.

INVENTOR:
O. A. Shotts
BY Munn & Co.
ATTORNEYS.

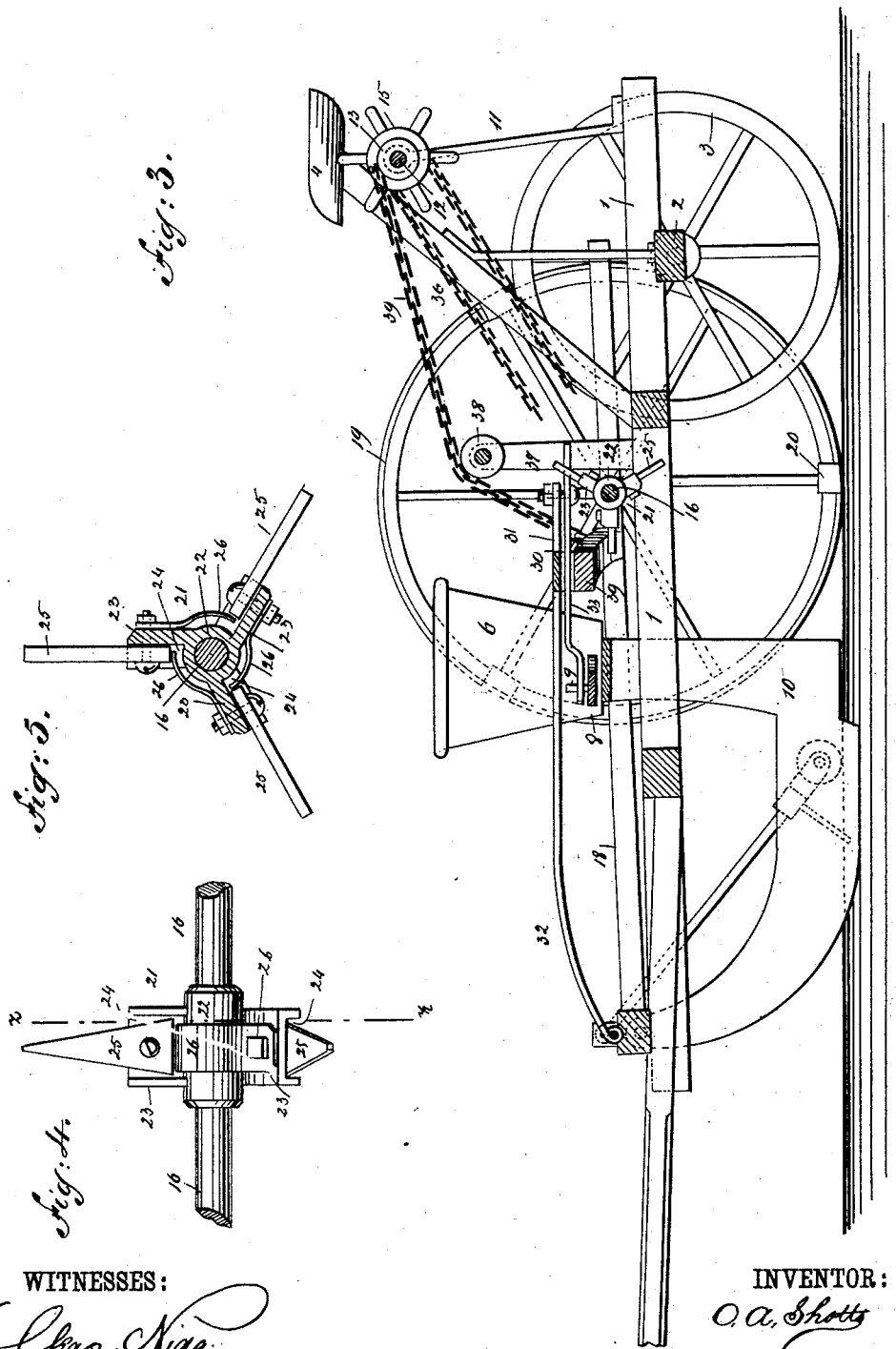

UNITED STATES PATENT OFFICE.

ORREN A. SHOTTS, OF OSCEOLA, IOWA, ASSIGNOR TO HIMSELF AND HENRY STIVERS, OF SAME PLACE.

CHECK-ROWING ATTACHMENT FOR CORN-PLANTERS.

SPECIFICATION forming part of Letters Patent No. 363,555, dated May 24, 1887.

Application filed December 8, 1886. Serial No. 220,980. (No model.)

*To all whom it may concern:*

Be it known that I, ORREN A. SHOTTS, of Osceola, in the county of Clarke and State of Iowa, have invented a new and Improved Check-Rowing Attachment for Corn-Planters, of which the following is a full, clear, and exact description.

My invention relates to an automatic check-rowing attachment for corn-planters, and has for its object to produce an attachment capable of being elevated bodily from the ground and adjusted laterally and by rotation, and wherein the drop is automatically operated by the action of the check-wheels.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
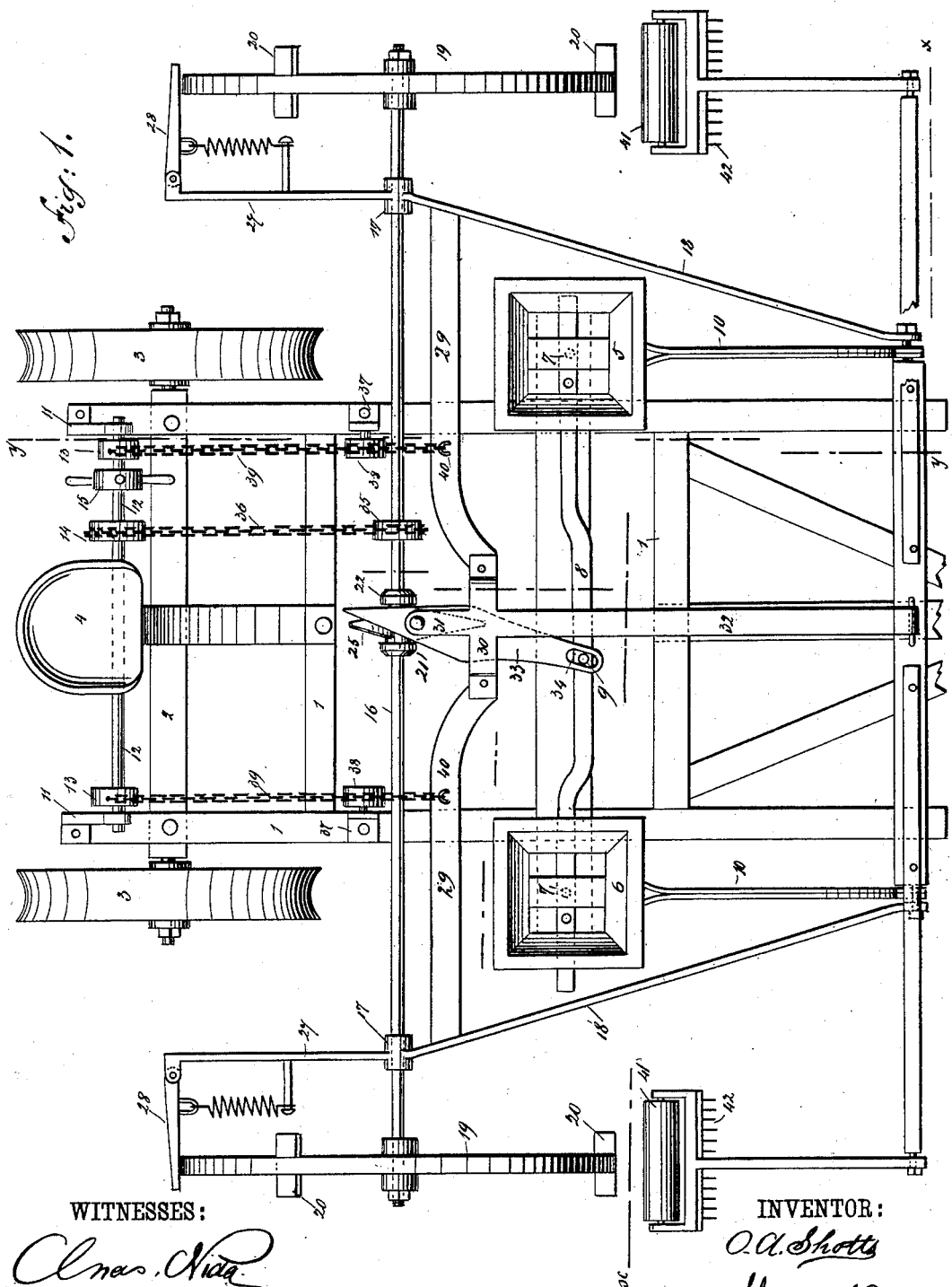
Figure 2:
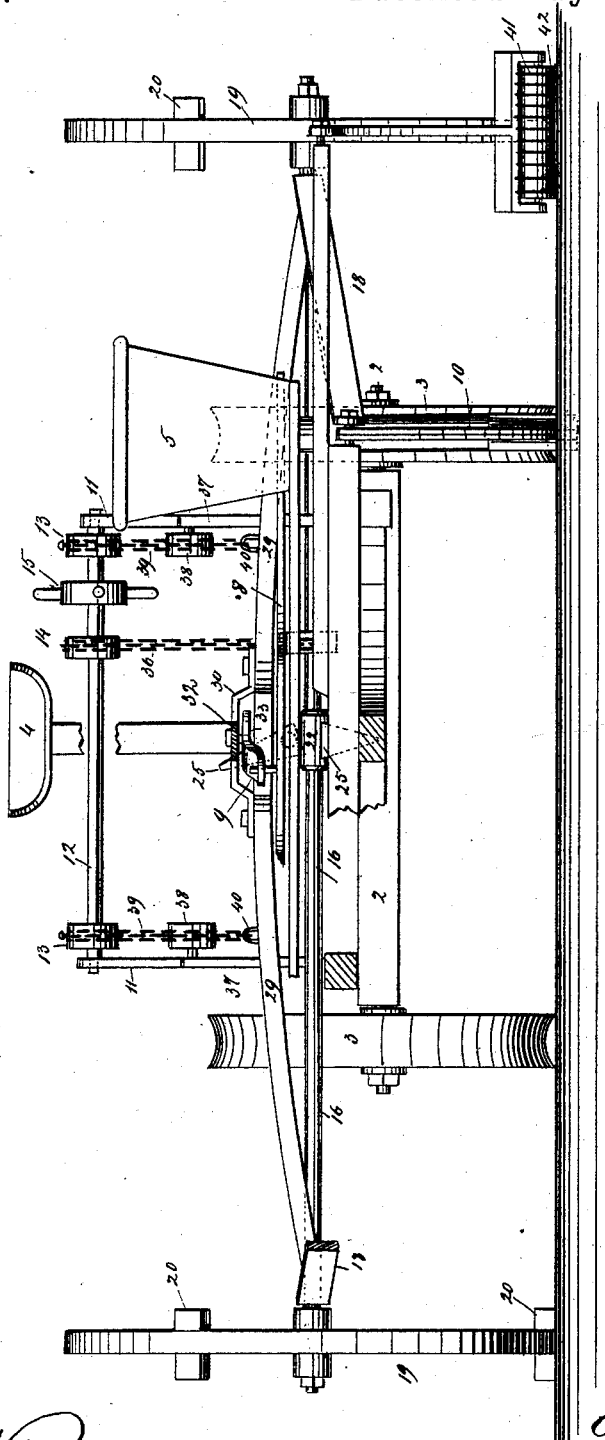

Figure 1 is a plan view of a planter having my device attached, and Fig. 2 is a front elevation, partly sectional, the section being taken on the broken line $x\ x$ in Fig. 1. Fig. 3 is a longitudinal vertical section thereof on the line $y\ y$ in Fig. 1; Fig. 4 is a front elevation of the tripping device, and Fig. 5 is a central vertical section through the same on the line $z\ z$ in Fig. 4.

The frame 1 of the planter is made in the usual rectangular form, having attached at the rear an axle, 2, adapted to carry ordinary supporting-wheels 3; and upon said frame, also at the rear, a seat, 4, is mounted to extend at an elevation over the axle.

Upon each side of the frame forward the center seed-boxes 5 and 6 are usually attached, provided with the necessary outlet-aperture 7; and transversely the said frame, supported upon a suitable beam therein, a sliding bar, 8, is provided, having a central vertical pin, 9, and apertured ends, which bar 8 is purposed to extend centrally through the said seed-boxes, the apertures in their ends registering with the aperture 7 in the boxes. The usual shoes, 10, are used in connection with the seed-boxes, having their ends pivoted to the front cross-bar of the frame.

At the rear of the frame 1 upwardly-projecting standards 11 are secured to the side beams, adapted to constitute a bearing for a short transverse shaft, 12, which shaft, extending beneath the seat, is provided near each end with pulleys or sprocket-wheels 13, secured thereto, and also with a third pulley or sprocket-wheel, 14, to the left of the seat 4, while between said pulley 14 and the one end pulley 13 a hand-wheel, 15, is keyed to said shaft.

To the rear of the center of the frame 1 a drive-shaft, 16, is extended transversely thereon and made to project beyond said frame, on each side, half or about half the distance usually intervening the rows, the said shaft being journaled in sleeves 17 and held in proper position by horizontal inclined rods 18 made integral or attached to said sleeves at one end and pivoted at the other to the front cross-bar of the frame, usually by the same pivotal bolt by which the shoes 10 are attached.

Upon each end of the drive-shaft 16 a wheel, 19, is keyed, preferably made of cast-iron, with possibly a steel tire, the tire in that event to be about an inch wide. The said wheels are made of such a diameter as to drop two or three hills of corn at each revolution, according to the height of the planter upon which they are used and the distance apart the hills are desired to be planted. Each wheel is provided upon its periphery with two or more projections, 20, according to the size, at equidistance apart, arranged with or without springs, as found in practice most desirable, the said projections constituting check-blocks, and being adapted to make impressions or indentations in the earth indicating the position of the cross-rows.

Centrally upon the drive-shaft 16 a shifting device, 21, is securely attached consisting of a body, 22, made preferably of cast or wrought iron, having two or more (preferably three) short radial arms, 23, each provided with a recess, 24, in its front face. Within the said recesses long tapering fingers 25 are pivoted to project a distance out therefrom, each finger being held by a spring, 26, secured at one end to the rear or smooth side of the arms 24, upon the same pivotal bolt pivoting the finger, the free end of said springs bearing against the under end or butt of said fingers, as shown in detail in Figs. 4 and 5.

To the sleeves 17, in which the drive-shaft 16 is journaled, I usually attach a rearwardly-projecting horizontal bar, 27, of a length to extend slightly beyond the periphery of the check-wheels 19, and pivot upon said bar a spring-actuated scraper, 28, to project parallel with and slightly beyond the periphery of said wheels, which construction is purposed to remove any trash or clots adhering thereto and keep said wheels and checks perfectly clean. Between the horizontal side bars, 18, and attached thereto a distance in front of the drive-shaft 16, I provide a transverse beam, 29, adapted to have secured centrally thereon, yet elevated therefrom, a metallic plate, 30, having a short integral rearward arm, 31, and an extended forward arm, 32, in the same plane, which latter arm is hinged in any approved manner centrally the front cross-beam of the planter-frame. To the short arm 31 of said plate 30, and beneath the same, I pivot a lever, 33, near its rear end, which end is made pointed and adapted to extend over the drive-shaft 16 in line with the fingers 25 of the tripping device 21, the other or forward end of the said lever 33 being made to intervene the transverse beam 29, and the guide-plate 30 is provided with an aperture, 34, purposed to engage the vertical pin 9 upon the box-slide 8. Thus as the check-wheels 19 revolve the shaft 16 is turned, and with it the tripping device 21, the fingers of which, alternately engaging the angular edges of the shifting-lever 33, impart to the same a reciprocating motion, which in turn being transferred to the sliding bar 8 through the pin 9, provides an automatic and uniform drop for the seed-boxes 5.

Upon the drive-shaft 16 to the left of the tripping device 21, I secure a pulley, 35, in alignment with the pulley 14 upon the short transverse shaft 12 and connect the two by a chain, 36, and at each side of the frame, immediately to the rear of the drive-shaft 16, I secure standards 37, in which are journaled pulleys 38 in alignment, respectively, with the end pulleys, 13. On the short transverse shaft 12 I now make fast a chain, 39, to each pulley 13, which chains, passing over the pulleys 38, are secured at their outer ends by staples 40, or otherwise, to the transverse carrying-beam 29 upon each side of the center, as shown in Fig. 1. Thus I provide a means for raising the entire check-rowing attachment from the ground at pleasure by simply turning the hand-wheel 15 near the driver's seat 4, one purpose of which is to bring the check-wheels in proper alignment with the counter-checks, should they vary, and also, in starting, to register quickly and accurately the check-blocks with the last impressions made, as by means of the chain 36 the shaft 16 and wheels 19 may readily be turned to cause the hills to be dropped to correspond with the hills previously planted.

I usually attach to the frame 1, so as to travel in front of the check-wheels 19, a roller, 41, having a rake, 42, secured to the casing forward the said roller, in order that the ground may be made comparatively smooth in advance of the said check-wheels.

Having thus fully described my invention, I claim as new and desire to secure by Letters Patent—

1. The combination, with the frame 1, the drive-shaft 16, the wheels 19, keyed thereto, provided with check-blocks 20, a tripping device, 21, secured centrally to the drive-shaft, and the pivoted side bars, 18, having sleeves 17 journaling said shaft, of the shifting-lever 33, pivoted in a guide-plate, 30, the box-slide 8, having a central pin, 9, engaging said lever, and the transverse beam 29, attached to the said pivoted side bars, 18, substantially as shown and described, and for the purpose herein set forth.

2. The combination, with the frame 1, the drive-shaft 16, journaled in sleeves 17, pivotally connected to the frame, the drive-wheels 19, carrying check-blocks 20, keyed to said shaft, and a tripping device secured thereon, consisting of the body 22, having radial arms 23, carrying spring-actuated pivoted fingers 25, of the shifting-lever 33, pivoted in a guide-plate, 30, the box-slide 8, provided with a pin, 9, engaging said lever, and the transverse beam 29, supporting said guide-plate, substantially as shown and described, and for the purpose herein set forth.

3. The combination, with the frame 1, having pulleys 38 journaled therein, a transverse shaft, 12, also journaled in said frame, carrying pulleys 13 and 14, and a hand-wheel, 15, of the drive-shaft 16, journaled in sleeves 17, pivotally connected to the frame, a pulley, 35, keyed to said shaft, the drive-wheels 19, having check-blocks 20, also keyed to said drive-shaft, the transverse beam 29, carrying a guide-plate, 30, hinged to the frame, the chains 39, connecting said transverse beam and pulleys 13, and the chain 36, passing over the pulleys 14 and 35, all arranged to operate substantially as shown and described, whereby the drive-shaft and mechanism carried thereby may be raised and adjusted, as set forth.

4. The combination, with the frame 1, the drive-shaft 16, journaled in sleeves 17, pivotally connected to said frame, and the drive-wheels 19, carrying check-blocks 20, keyed to said shaft, of the roller 41 and rake 42, attached to the front portion of the frame forward the said wheels, substantially as shown and described, whereby the ground is prepared in advance of the drive-wheels and check-blocks, as set forth.

5. The combination, with the frame, the drive-shaft 16, journaled in sleeves 17, pivotally connected to said frame, and the drive-wheels 19, carrying check-blocks 20, keyed to said shaft, of the horizontal arms 27, attached to said sleeves, the spring-actuated lever 28, held at right angles to said horizontal arms to the rear of said drive-wheels, substantially as shown and described, whereby the said wheels and blocks are kept constantly clean, as set forth.

6. In an attachment for corn-planters, a tripping device adapted to communicate motion to the box-slide, consisting of a body, 22, having radial arms 23, recessed upon opposing faces provided with tapering fingers 25, pivoted in said recesses, and springs secured to the smooth side of said arms adapted to bear against the lower edge of said fingers, substantially as shown and described, and for the purpose herein set forth.

ORREN A. SHOTTS.

Witnesses:
MARY OSMOND,
LEE H. ESTES.